United States Patent
Van Huis et al.

(10) Patent No.: US 12,328,399 B2
(45) Date of Patent: Jun. 10, 2025

(54) SENSOR DATA AUTHENTICATION

(71) Applicant: ZEBRA TECHNOLOGIES CORPORATION, Lincolnshire, IL (US)

(72) Inventors: James P. Van Huis, Des Plaines, IL (US); Andrew J. Pekarske, Mundelein, IL (US); Michael T. Cranston, Carpentersville, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 260 days.

(21) Appl. No.: 17/697,648

(22) Filed: Mar. 17, 2022

(65) Prior Publication Data
US 2023/0299970 A1 Sep. 21, 2023

(51) Int. Cl.
*H04L 9/32* (2006.01)
*H04L 9/08* (2006.01)

(52) U.S. Cl.
CPC .......... *H04L 9/3247* (2013.01); *H04L 9/0825* (2013.01); *H04L 9/3263* (2013.01)

(58) Field of Classification Search
CPC ...... H04L 9/3247; H04L 9/0825; H04L 9/326
See application file for complete search history.

(56) References Cited

U.S. PATENT DOCUMENTS

| | | | |
|---|---|---|---|
| 2002/0144109 A1 | 10/2002 | Benantar et al. | |
| 2013/0086377 A1 | 4/2013 | Clifone et al. | |
| 2014/0266688 A1 | 9/2014 | Hruska et al. | |
| 2016/0080936 A1 | 3/2016 | Rachuri et al. | |
| 2017/0164193 A1 | 6/2017 | Bicket et al. | |
| 2017/0353435 A1* | 12/2017 | Pritikin | H04W 4/02 |

(Continued)

FOREIGN PATENT DOCUMENTS

IE    S20070726 A2 * 10/2007

OTHER PUBLICATIONS

Khan et al. "A secure framework for authentication and encryption using improved ECC for IoT-based medical sensor data." IEEE Access (2020): 52018-52027. Retrieved on Jun. 21, 2023 (Jun. 21, 2023) from <https://ieeexplore.ieee.org/abstract/document/9035402> entire document.

(Continued)

*Primary Examiner* — Lesa M Kennedy (57) ABSTRACT

In some implementations, a device may transmit, to an authentication server, a certificate signing request (CSR) based on a private key stored on a data logger, wherein the data logger is integrated with a sensor within the device. The device may receive, via the data logger and from the authentication server, a signed device certificate based on the CSR. Additionally, the device may receive, via the data logger and from the authentication server, a signed owner certificate associated with a controller. The device may receive, via the data logger and from the controller, a command signed using the owner certificate. Accordingly, the device may store, in the data logger, measurements from the sensor based on the command. The device may generate a data structure including the stored measurements, wherein the data structure is signed using the signed device certificate. The device may transmit, to the authentication server, the data structure.

20 Claims, 10 Drawing Sheets

(56) References Cited

U.S. PATENT DOCUMENTS

| 2019/0286806 A1* | 9/2019 | Robinson | H04W 12/104 |
| 2020/0153697 A1* | 5/2020 | Turner | H04L 63/0823 |
| 2022/0294640 A1* | 9/2022 | Hanna | H04L 67/1097 |

OTHER PUBLICATIONS

International Search Report and Written Opinion for International Application No. PCT/US2023/015436 mailed on Jun. 14, 2023.

* cited by examiner

SENSOR DATA AUTHENTICATION

TECHNICAL FIELD

The present disclosure relates generally to authenticating data and, for example, to sensor data authentication.

BACKGROUND

Environmental sensors, such as temperature and humidity sensors, are often integrated with data loggers such that periodic measurements from the environmental sensors can be stored. Users can therefore access and view the stored measurements later. In some cases, the stored measurements may be communicated (e.g., via a wired communication or wireless communication) to another device or the user for review. Therefore, there is a need to ensure that the measurements received by the users are authentic and/or accurate.

SUMMARY

Some implementations described herein relate to a method for authenticating measurements. The method may include transmitting, by a device including a data logger and to an authentication server, a certificate signing request (CSR) based on a private key stored on the data logger, where the data logger is integrated with a sensor within the device. The method may include receiving, by the device and via the data logger and from the authentication server, a signed device certificate based on the CSR. The method may include receiving, by the device and via the data logger and from the authentication server, a signed owner certificate associated with a controller. The method may include receiving, by the device and via the data logger and from the controller, a command signed using the owner certificate. The method may include storing, by the device and in the data logger, measurements from the sensor based on the command. The method may include generating, by the device, a data structure including the stored measurements, where the data structure is signed using the signed device certificate. The method may include transmitting, to the authentication server, the data structure.

Some implementations described herein relate to a sensor device. The sensor device may include one or more memories and one or more processors communicatively coupled to the one or more memories. The one or more processors may be configured to transmit, by the sensor device and to an authentication server, a CSR based on a private key stored on a data logger, where the data logger is integrated with a sensor within the sensor device. The one or more processors may be configured to receive, by the sensor device and via the data logger and from the authentication server, a signed device certificate based on the CSR. The one or more processors may be configured to receive, by the sensor device and via the data logger and from the authentication server, a signed owner certificate associated with a controller. The one or more processors may be configured to store, by the sensor device and in the data logger, measurements from the sensor. The one or more processors may be configured to receive, by the sensor device and via the data logger and from the controller, a command signed using the owner certificate. The one or more processors may be configured to generate, by the sensor device and based on the command, a data structure including the stored measurements and signed using the device certificate. The one or more processors may be configured to transmit, to the authentication server, the data structure.

Some implementations described herein relate to a tangible machine-readable medium that stores a set of instructions for a device. The set of instructions, when executed by one or more processors of the device, may cause the device to transmit, by the device and to an authentication server, a CSR based on a private key stored on a data logger, where the data logger is integrated with a sensor within the device. The set of instructions, when executed by one or more processors of the device, may cause the device to receive, at the device and via the data logger and from the authentication server, a signed device certificate based on the CSR. The set of instructions, when executed by one or more processors of the device, may cause the device to receive, by the device and via the data logger and from the authentication server, a signed owner certificate associated with a controller. The set of instructions, when executed by one or more processors of the device, may cause the device to store, by the device and in the data logger, measurements from the sensor. The set of instructions, when executed by one or more processors of the device, may cause the device to receive, by the device and via the data logger and from the controller, a command signed using the owner certificate. The set of instructions, when executed by one or more processors of the device, may cause the device to generate, by the device and based on the command, a data structure including the stored measurements and signed using the device certificate. The set of instructions, when executed by one or more processors of the device, may cause the device to transmit, to the authentication server, the data structure.

DETAILED DESCRIPTION

The following detailed description of example implementations refers to the accompanying drawings. The same reference numbers in different drawings may identify the same or similar elements.

Integrated sensors are commonly used in industrial and Internet of Things (IoT) applications. For example, a delivery truck may be equipped with a temperature sensor integrated with a data logger, such that an owner, operator, and/or customer associated with the truck may access and view measurements from the temperature sensor after the delivery truck completes a delivery. Accordingly, the owner, operator, and/or customer may verify that the shipment satisfied a temperature threshold during shipment.

In order to reduce power consumption, the sensors may be at least partially integrated with data loggers that can store data and transmit data in batches rather than transmitting individual measurements. However, the data loggers are subject to malicious attacks that can corrupt the stored data.

One solution is to encrypt the stored data on the data loggers and use a remote server to decrypt the data. However, encryption and decryption are processes that rely on significant processing resources and power consumption. Data loggers in particular do not have significant processing power or available battery power.

Using certificates to authenticate the data increases security without incurring the processing resources and power costs of encryption. Some implementations described herein enable a certificate exchange between a data logger and a server in order to authenticate measurements provided by the data logger. As a result, security is increased while also conserving power and processing resources on the data logger as compared with using encryption. Additionally, some implementations described herein enable a certificate exchange between a data logger and a server in order to authenticate commands provided to the data logger. As a result, security is further increased while also further conserving power and processing resources on the data logger as compared with using encryption.

FIGS. 1A-1D are diagrams of an example implementation 100 associated with authenticating sensor data. As shown in FIGS. 1A-1D, example implementation 100 includes a sensor device, an authentication server, and a customer device. These devices are described in more detail below in connection with FIG. 3 and FIG. 4.

Figure 1A:
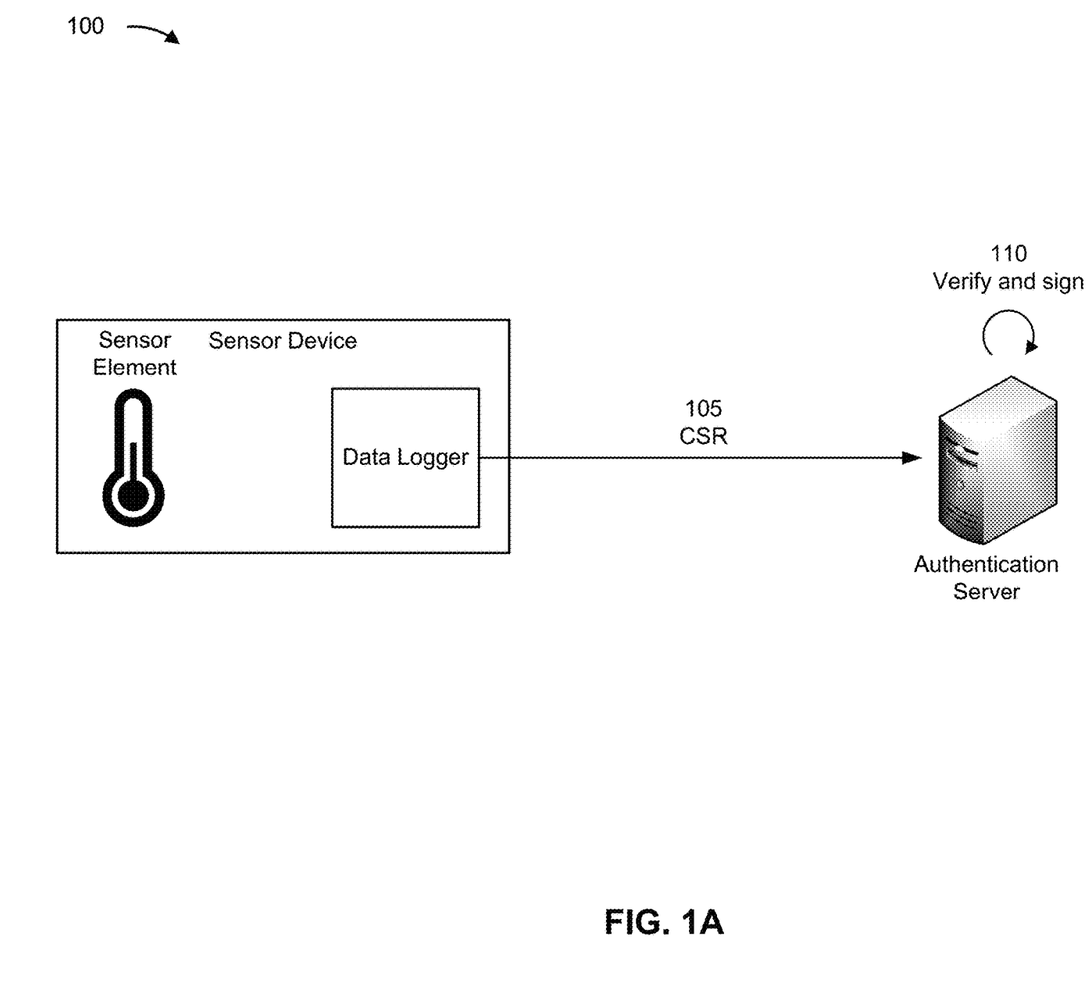
FIGS. 1A-1D are diagrams of an example implementation described herein.

As shown in FIG. 1A, the sensor device may include a sensor element at least partially integrated with a data logger. For example, the sensor element may include a temperature sensor, a humidity sensor, and/or another type of environmental sensor. Rather than being integrated with a user device or another interactive computing device, the sensor element is at least partially integrated with the data logger (e.g., a microprocessor, application-specific integrated circuit (ASIC), and/or another type of integrated circuit with a small (e.g., less than 2 gigabytes (GB)) memory and a wireless transceiver or wired port).

As shown by reference number 105, the data logger may transmit, and the authentication server may receive, a certificate signing request (CSR) based on a private key stored on the data logger. For example, the data logger may transmit the CSR over-the-air (OTA) using a wireless network. Additionally, or alternatively, the data logger may transmit the CSR via a bridge, as described in connection with FIG. 2A.

In some implementations, a secure boot key may be stored in a read-only portion of a memory of the data logger. Accordingly, the data logger may use the secure boot key to boot a secure (or trusted) operating system (OS). The secure OS may then generate the private key used to generate the CSR and store the private key on the data logger (e.g., on a memory of the data logger). For example, the CSR may include a public key corresponding to the private key of the data logger and an identifier associated with the data logger (e.g., a model number, a serial number, a device name, an Internet protocol (IP) address, and/or another piece of information associated with the data logger). Additionally, the data logger may digitally sign the CSR using the private key.

Accordingly, as shown by reference number 110, the authentication server verifies the CSR and signs a device certificate based on the CSR. For example, the authentication server may verify that a signature algorithm, indicated by the CSR, corresponds to the digital signature of the CSR. Additionally, or alternatively, the authentication server may verify that the digital signature corresponds to an expected signature out of a set of expected signatures corresponding to a set of data loggers managed by the authentication server.

Accordingly, the authentication server generates a signed device certificate based on the verification(s). For example, the device certificate (also referred to as an "identifier certificate," a "digital certificate," or a "public key certificate") may include information associated with the public key and information associated with the data logger. Additionally, the authentication server may sign the device certificate using a private key associated with the authentication server. In some implementations, the device certificate may additionally include an identifier of a certificate authority (e.g., implemented at the authentication server) associated with the signature.

Figure 1B:
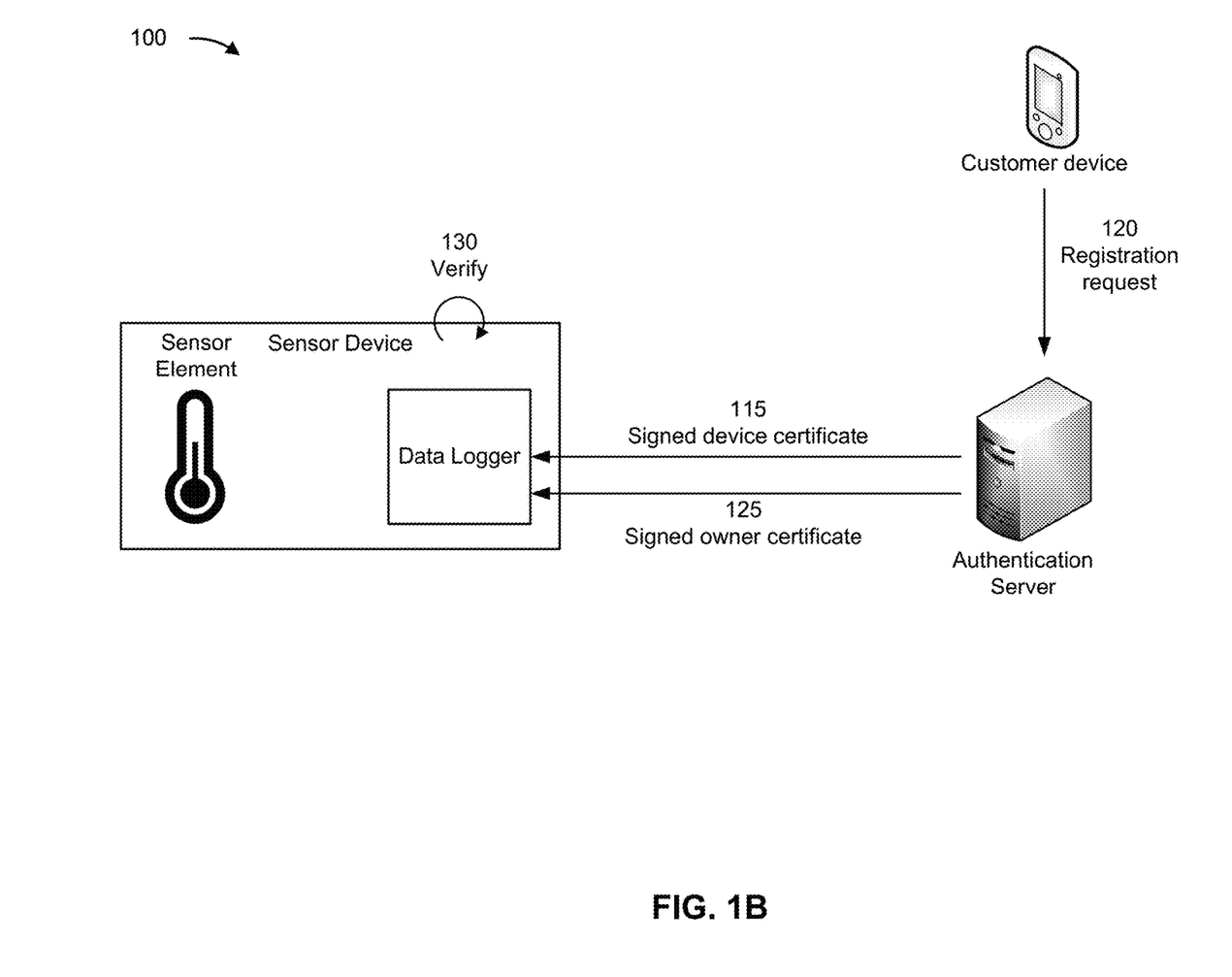

As shown in FIG. 1B and by reference number 115, the authentication server may transmit, and the data logger may receive, the signed device certificate. For example, the authentication server may transmit the signed device certificate OTA using a wireless network. Additionally, or alternatively, the authentication server may transmit the signed device certificate via a bridge, as described in connection with FIG. 2B.

Additionally, as shown by reference number 120, the customer device may transmit, and the authentication server may receive, a registration request associated with the customer device and the sensor device. For example, the registration request may include an identifier associated with the customer device (e.g., a device name, a username, an IP address, a universally unique identifier (UUID), and/or another piece of information associated with the customer device) and an identifier associated with the sensor device (e.g., a model number, a serial number, a device name, an IP address, and/or another piece of information associated with the sensor device). Additionally, the registration request may include credentials associated with a user of the customer device (e.g., a password, a secret answer, a personal identification number (PIN), and/or another piece of information associated with the user). Accordingly, the authentication server may verify the registration request using the credentials.

Accordingly, as shown by reference number 125, the authentication server may generate and transmit, and the data logger may receive, a signed owner certificate. For example, the authentication server may transmit the signed owner certificate OTA using a wireless network. Additionally, or alternatively, the authentication server may transmit the signed owner certificate via a bridge, as described in connection with FIG. 2B.

The authentication server may generate the signed owner certificate based on verifying the customer device (and/or the user thereof). For example, the owner certificate (also referred to as an "identity certificate," a "digital certificate," or a "public key certificate") may include information associated with a public key provided to the customer device and corresponding to a private key stored by the authentication server. Additionally, the authentication server may sign the owner certificate using the private key. In some implementations, the owner certificate may additionally include an identifier of a certificate authority (e.g., implemented at the authentication server) associated with the signature. Additionally, or alternatively, the device certificate may additionally include an identifier of the data logger (e.g., a system identity (ID), a serial number, a device name, an IP address, and/or another piece of information associated with the data logger).

Although described in connection with the customer device, the authentication server may additionally or alternatively transmit a signed owner certificate associated with another type of controller. For example, the controller may include a remote or another type of portable electronic device that communicates wirelessly with the authentication server.

As shown by reference number 130, the data logger may verify the device certificate using the private key. For example, the data logger may verify the signature of the device certificate against the private key stored on the data logger. Additionally, the data logger may verify the owner certificate using the signature and information associated with the authentication server included in the owner certificate.

Additionally, in some implementations, the data logger may verify a time associated with the device certificate against a current system time for the data logger. For example, the data logger may reject certificates that are associated with a later time than the current system time and/or that are different from the current system time by an amount of time that satisfies a suspicion threshold (e.g., where the suspicion threshold is based on how long transmissions from and to the authentication server last and/or based on how long CSR processing at the authentication server lasts). Similarly, the data logger may verify a time associated with the owner certificate against the current system time for the data logger.

Figure 1C:
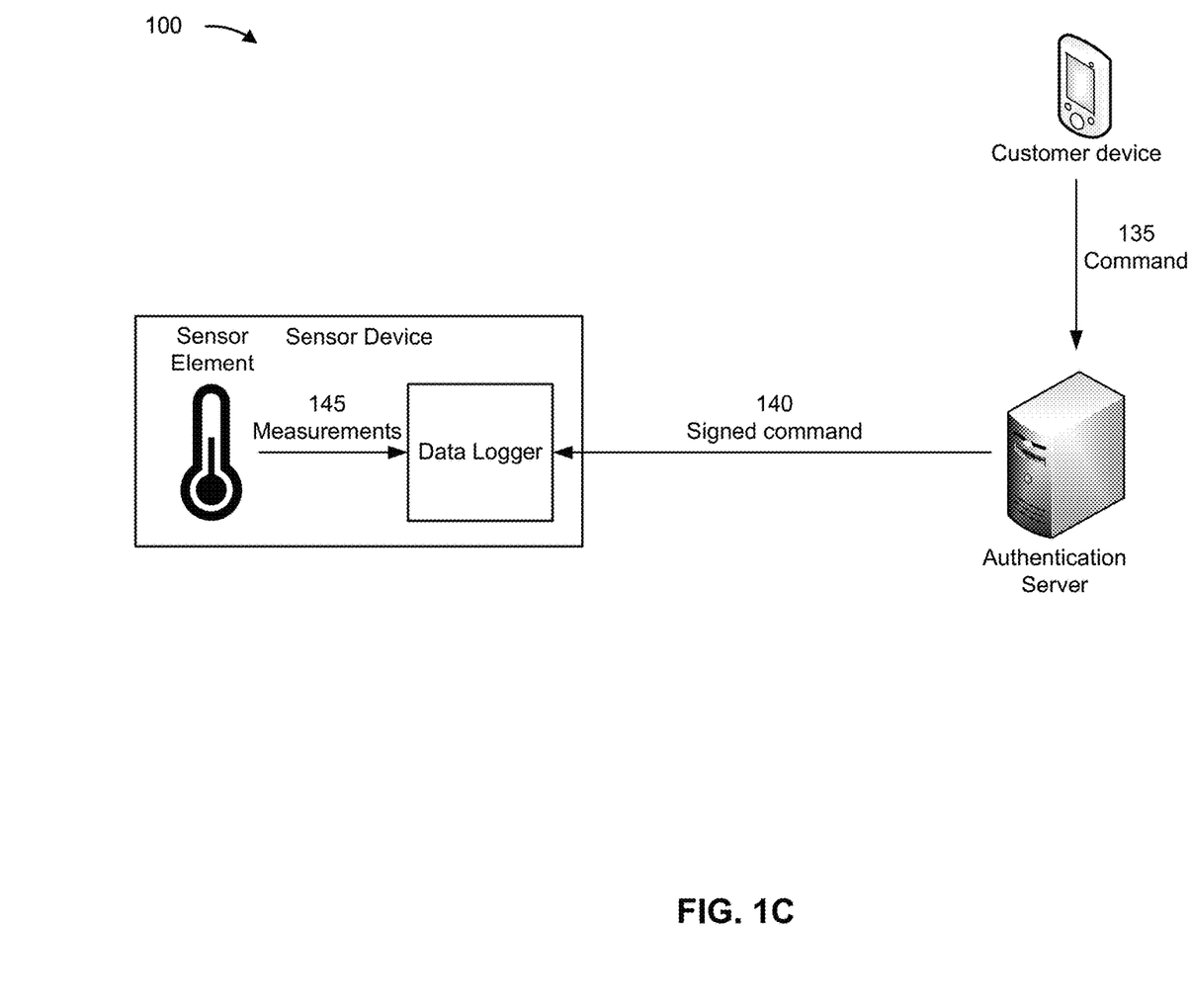

Accordingly, in some implementations, and as shown in FIG. 1C and by reference number 135, the customer device may transmit, and the authentication server may receive, a command associated with the sensor device. For example, the command may include a command for the sensor device to begin collecting measurements, a command for the sensor device to stop collecting measurements, a command with information for calibrating the sensor element, a command to collect measurements for a specified amount of time, or a command to collect measurements until a specific date and/or time, among other examples.

The authentication server may verify the command (e.g., using credentials that are associated with the customer device and/or the user thereof and that are included in a message with the command and/or using a public key associated with the owner certificate and used by the customer device to sign the command) and sign the command using the owner certificate. For example, the authentication server may sign the command using a private key stored on the authentication server and associated with the owner certificate. In some implementations, the authentication server may bundle a message from the customer device including the command into a larger message that is signed using the owner certificate. Alternatively, the authentication server may extract the command from the message from the customer device and re-encode the command into a message that is signed using the owner certificate.

Accordingly, as shown by reference number 140, the authentication server may transmit, and the data logger may receive, the signed command. For example, the authentication server may transmit the signed command OTA using a wireless network. Additionally, or alternatively, the authentication server may transmit the signed command via a bridge (e.g., similarly as described in connection with FIG. 2B).

The data logger may verify the command using the owner certificate. For example, the data logger may verify the signature of the owner certificate against the signature on the command. Accordingly, the data logger may reject commands intended for other data loggers and/or devices. By using the owner certificate to verify commands rather than using encryption to secure the commands, the data logger conserves power and processing resources.

Accordingly, in some implementations, and as shown by reference number 145, the data logger may store measurements from the sensor element based on the command. For example, the command may include a command for the sensor device to begin collecting measurements. Alternatively, the command may include a command to collect measurements for a specified amount of time or a command to collect measurements until a specific date and/or time, such that the data logger stores the measurements until expiry of the specified amount of time or until the specific date and/or time is reached.

Although described using an example command to collect measurements, the data logger may alternatively collect measurements unless a command to stop is received. In some implementations, the command to stop may be for a specified amount of time or a command to stop collecting measurements until a specific date and/or time.

Although described as using a signed command, the data logger may additionally or alternatively receive an analog signal (e.g., via a button and/or another type of physical interface) that functions as the command. Alternatively, the data logger may track measurement values from the sensor device and trigger measurement collection when one or more measurement values from the sensor device satisfy a triggering threshold. For example, the data logger may begin storing measurements when a temperature (and/or humidity) drops (or rises) below (or above) a triggering threshold. Correspondingly, the data logger may stop storing measurements when the temperature (and/or humidity) rises (or drop) above (or below) the triggering threshold. Although described as using the same threshold, the data logger may begin storing measurements based on a different threshold than a threshold used to trigger the data logger to stop storing measurements (e.g., in order to provide at least some hysteresis).

The data logger may determine to transmit stored measurements to the authentication server. For example, the data logger may transmit the measurements periodically. Alternatively, the data logger may receive another command from the customer device (e.g., similarly as described above) to transmit stored measurements to the authentication server. By waiting to sign the stored measurements until receiving a request for the stored measurements, the data logger conserves memory that would otherwise be occupied in storing encrypted and/or signed measurements. Additionally, when a subset of a stored set of measurements are requested (e.g., measurements from a particular time frame and/or a particular quantity of measurements) the data logger conserves power and processing resources by signing only the subset of the stored set of measurements that are transmitted. Additionally, in some implementations, the customer device may request signed measurements directly from the data logger without authenticating the signature via the authentication server.

Figure 1D:
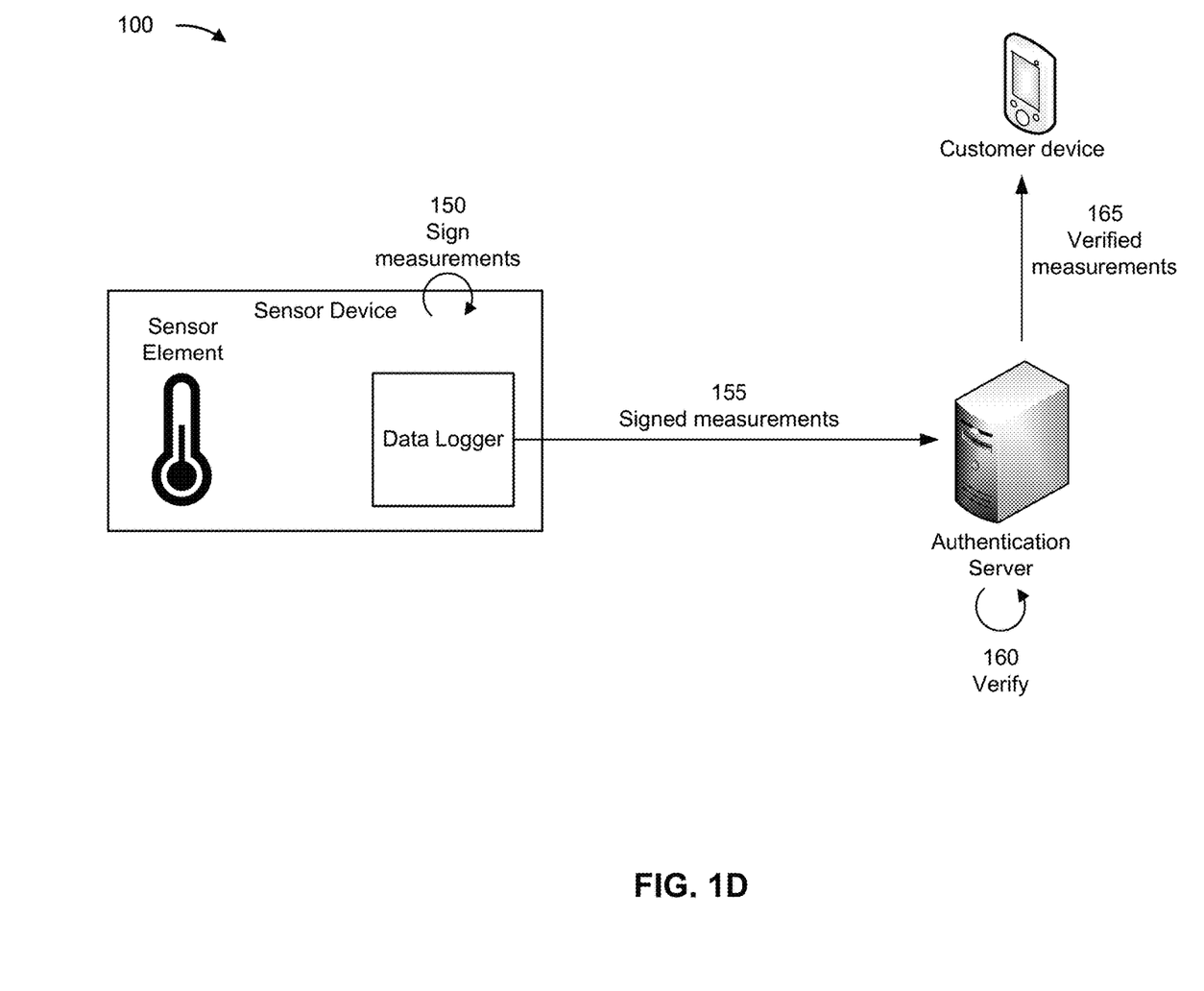

Accordingly, as shown in FIG. 1D and by reference number 150, the data logger may generate a data structure including the measurements and signed using the device certificate. For example, the data logger may generate a table (or other relational data structure) with the measurements and sign a message including the table using the device certificate. As a result, the data structure including the measurements may be unencrypted. By using the device certificate to authenticate the data rather than using encryption to secure the data, the data logger conserves power and processing resources.

As shown by reference number 155, the data logger may transmit, and the authentication server may receive, the data structure. For example, the data logger may transmit the data structure OTA using a wireless network. Additionally, or alternatively, the data logger may transmit the data structure via a bridge, as described in connection with FIG. 2C.

Accordingly, as shown by reference number 160, the authentication server may verify the data structure using the signature. For example, the authentication server may verify that the digital signature corresponds to an expected signature based on the authentication server generating the device certificate (e.g., as described in connection with reference number 110).

As shown by reference number 165, the authentication server may transmit, and the customer device may receive, the verified measurements from the data structure. Accordingly, the customer device may display and/or store the verified measurements.

By using techniques as described in connection with FIGS. 1A-1D, a device certificate is used to authenticate measurements from the data logger such that security is increased without incurring processing resource and power costs of encryption. Additionally, in some implementations, an owner certificate is used to authenticate commands provided to the data logger such that security is further increased while also further conserving power and processing resources on the data logger as compared with using encryption.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2A:
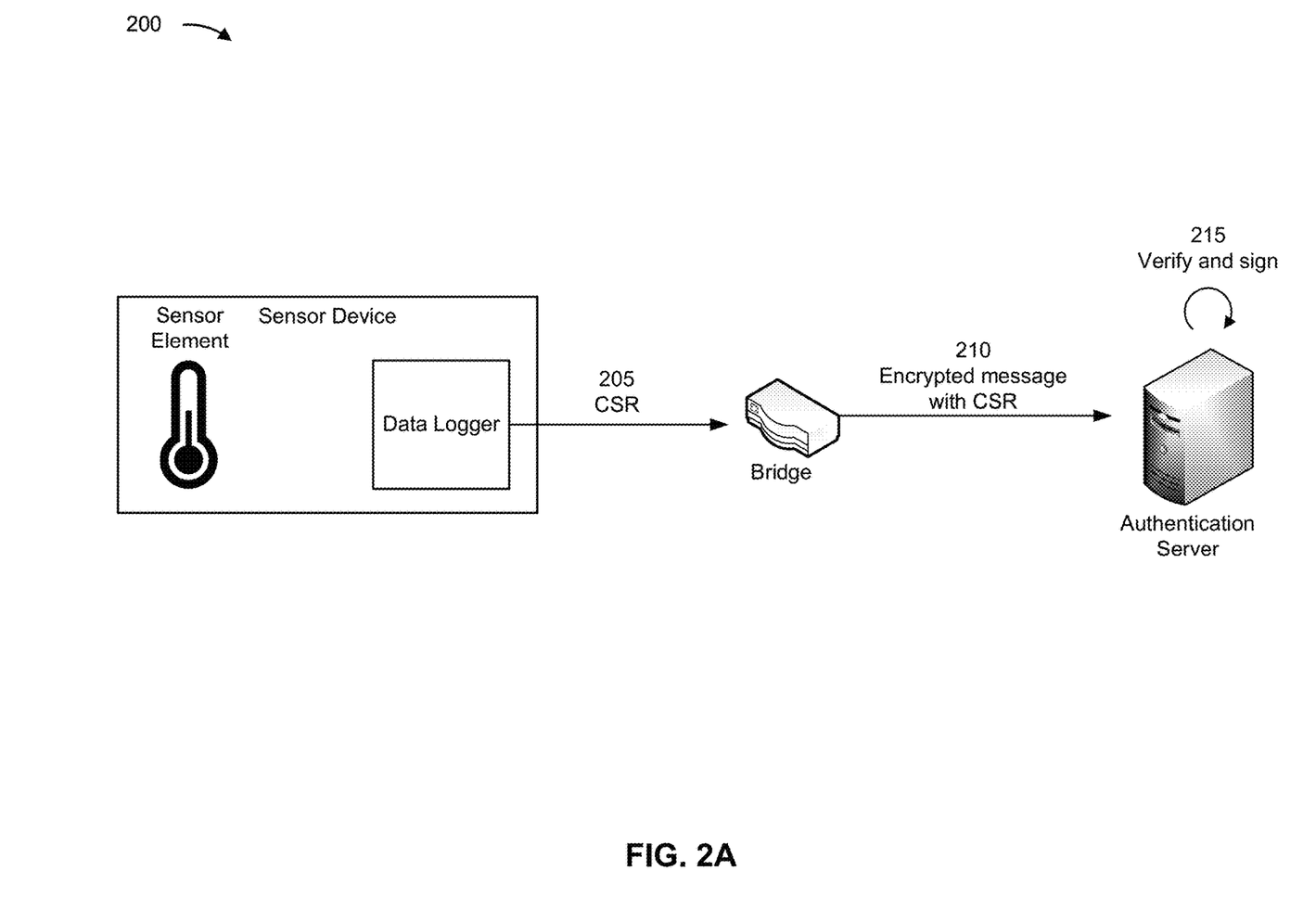
FIGS. 2A-2C are diagrams of another example implementation described herein.
Figure 2B:
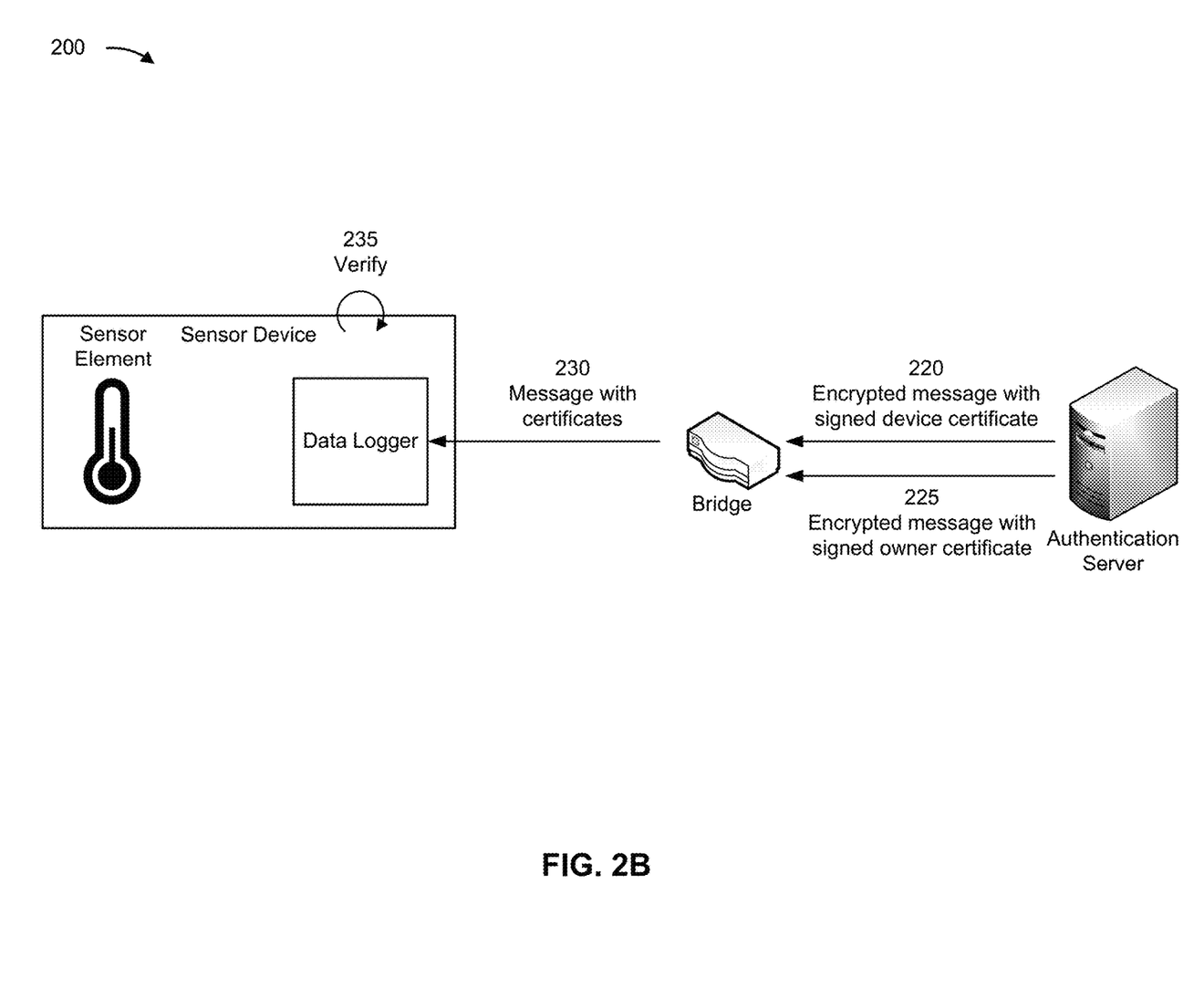
Figure 2C:
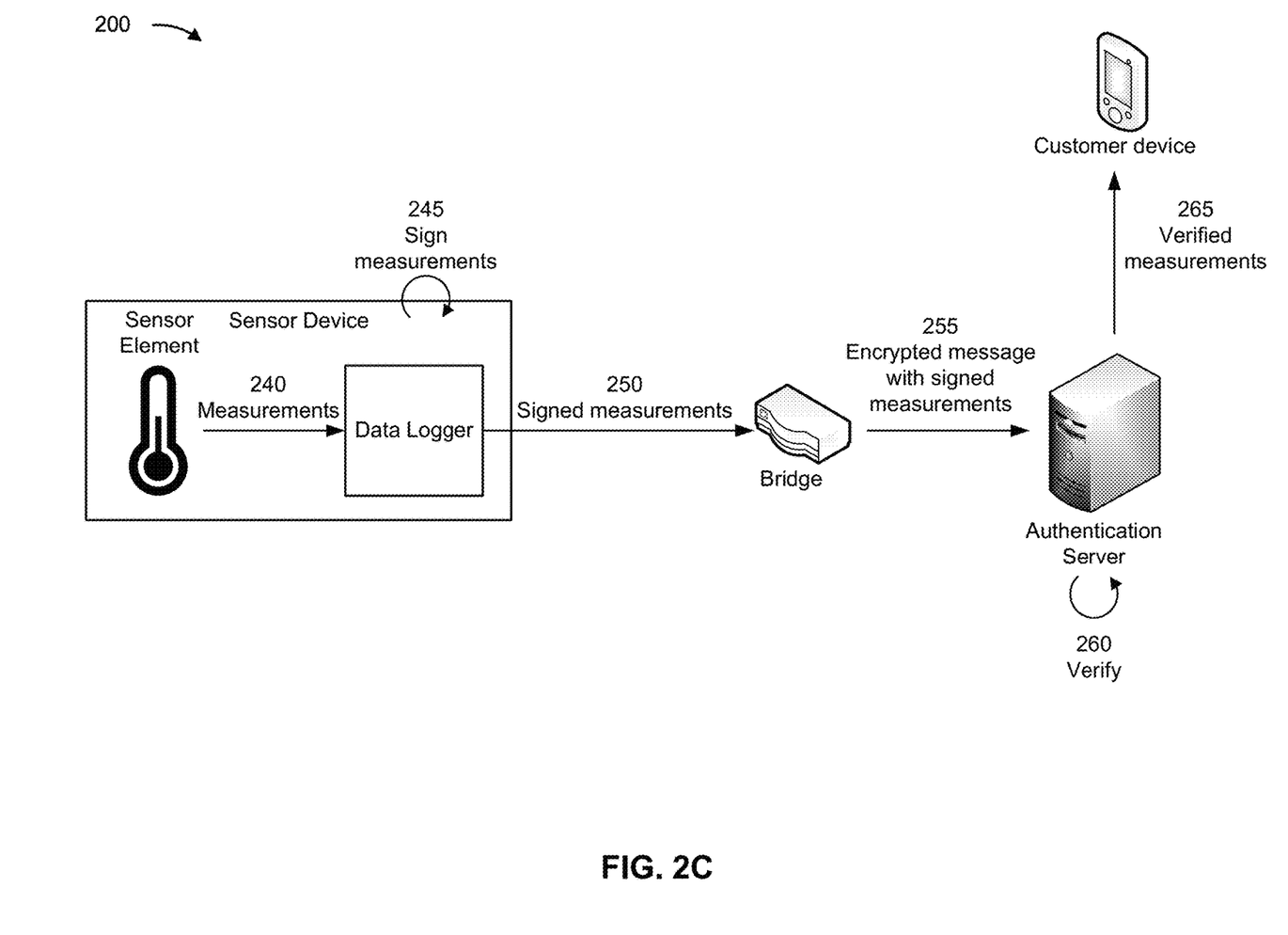

FIGS. 2A-2C are diagrams of an example implementation 200 associated with authenticating sensor data. As shown in FIGS. 2A-2C, example implementation 200 includes a sensor device, an authentication server, a customer device, and a bridge. These devices are described in more detail below in connection with FIG. 3 and FIG. 4.

As shown in FIG. 2A and by reference number 205, the data logger may transmit, and the bridge may receive, a CSR based on a private key stored on the data logger. For example, the data logger may transmit the CSR as described in connection with FIG. 1A.

Accordingly, the bridge may bundle a message from the data logger including the CSR into a larger message. Alternatively, the bridge may extract the CSR from the message from the data logger and re-encode the CSR into a message. The bridge may encrypt the message (or the larger message) using a private key (or a certificate) associated with the bridge. For example, the bridge may use transport link security (TLS) and/or another type of cryptographic protocol to securely transmit the CSR to the authentication server.

As shown by reference number 210, the bridge may transmit, and the authentication server may receive, the encrypted message including the CSR from the data logger. Accordingly, as shown by reference number 215, the authentication server verifies the CSR and signs a device certificate based on the CSR. For example, the authentication server may verify the CSR and sign the device certificate as described in connection with FIG. 1A.

As shown in FIG. 2B and by reference number 220, the authentication server may transmit, and the bridge may receive, the signed device certificate. For example, the authentication server may transmit the signed device certificate as described in connection with FIG. 1B. Additionally, as shown by reference number 225, the authentication server may generate and transmit, and the bridge may receive, a signed owner certificate. For example, the authentication server may transmit the signed owner certificate as described in connection with FIG. 1B. Similarly, as described in connection with FIG. 1B, the signed owner certificate may be based on a registration message from the customer device or another controller.

Accordingly, the bridge may bundle one or more messages from the authentication server including the signed certificates into a larger message. Alternatively, the bridge may extract the signed certificates from the message(s) from the authentication server and re-encode the signed certificates into one or more messages. In some implementations, the authentication server may encrypt the message(s) including the signed certificates using a private key (or a certificate) associated with the bridge. For example, the authentication server may use TLS and/or another type of cryptographic protocol to securely transmit the signed certifications to the bridge. Accordingly, the bridge may decrypt the message(s) from the authentication server in order to forward the signed certificates to the data logger.

Accordingly, as shown by reference number 230, the bridge may transmit, and the data logger may receive, message(s) including the signed certificates from the authentication server. Accordingly, as shown by reference number 235, the data logger verifies the message and stores the signed certificates. For example, the authentication server may verify the message similarly as the data logger verifies commands, as described in connection with FIG. 1B.

As shown in FIG. 2C and by reference number 240, the data logger may store measurements from the sensor element. For example, the data logger may store the measurements based on a command from the customer device or may store the measurements periodically, as described in connection with FIG. 1C.

As shown by reference number 245, the data logger may generate a data structure including the measurements and signed using the device certificate. For example, the data logger may generate a table (or other relational data structure) with the measurements and sign a message including the table using the device certificate. As a result, the data structure including the measurements may be unencrypted. By using the device certificate to authenticate the data rather than using encryption to secure the data, the data logger conserves power and processing resources.

As shown by reference number 250, the data logger may transmit, and the bridge may receive, the data structure. For example, the data logger may transmit the data structure as described in connection with FIG. 1D.

Accordingly, the bridge may bundle a message from the data logger including the data structure into a larger message. Alternatively, the bridge may extract the data structure from the message from the data logger and re-encode the data structure into a message. The bridge may encrypt the message (or the larger message) using a private key (or a certificate) associated with the bridge. For example, the bridge may use TLS and/or another type of cryptographic protocol to securely transmit the CSR to the authentication server.

Accordingly, as shown by reference number 255, the bridge may transmit, and the authentication server may receive, the encrypted message including the signed measurements from the data logger. Accordingly, as shown by reference number 260, the authentication server verifies the message (e.g., using the signature on the message) and verifies the measurements (e.g., using the signature on the measurements). For example, the authentication server may verify the measurements as described in connection with FIG. 1D and may similarly verify the message.

As shown by reference number 265, the authentication server may transmit, and the customer device may receive, the verified measurements from the data structure. Accordingly, the customer device may display and/or store the verified measurements.

By using techniques as described in connection with FIGS. 2A-2C, the bridge is used to reduce power and processing resources used when the data logger communicates with the authentication server. Accordingly, the bridge uses TLS and/or another type of encryption protocol such that security is not compromised while also continuing to conserve power and processing resources on the data logger as compared with using encryption at the data logger.

As indicated above, FIGS. 2A-2C are provided as an example. Other examples may differ from what is described with regard to FIGS. 2A-2C. The number and arrangement of devices shown in FIGS. 2A-2C are provided as an example. In practice, there may be additional devices, fewer devices, different devices, or differently arranged devices than those shown in FIGS. 2A-2C. Furthermore, two or more devices shown in FIGS. 2A-2C may be implemented within a single device, or a single device shown in FIGS. 2A-2C may be implemented as multiple, distributed devices. Additionally, or alternatively, a set of devices (e.g., one or more devices) shown in FIGS. 2A-2C may perform one or more functions described as being performed by another set of devices shown in FIGS. 2A-2C.

Figure 3:
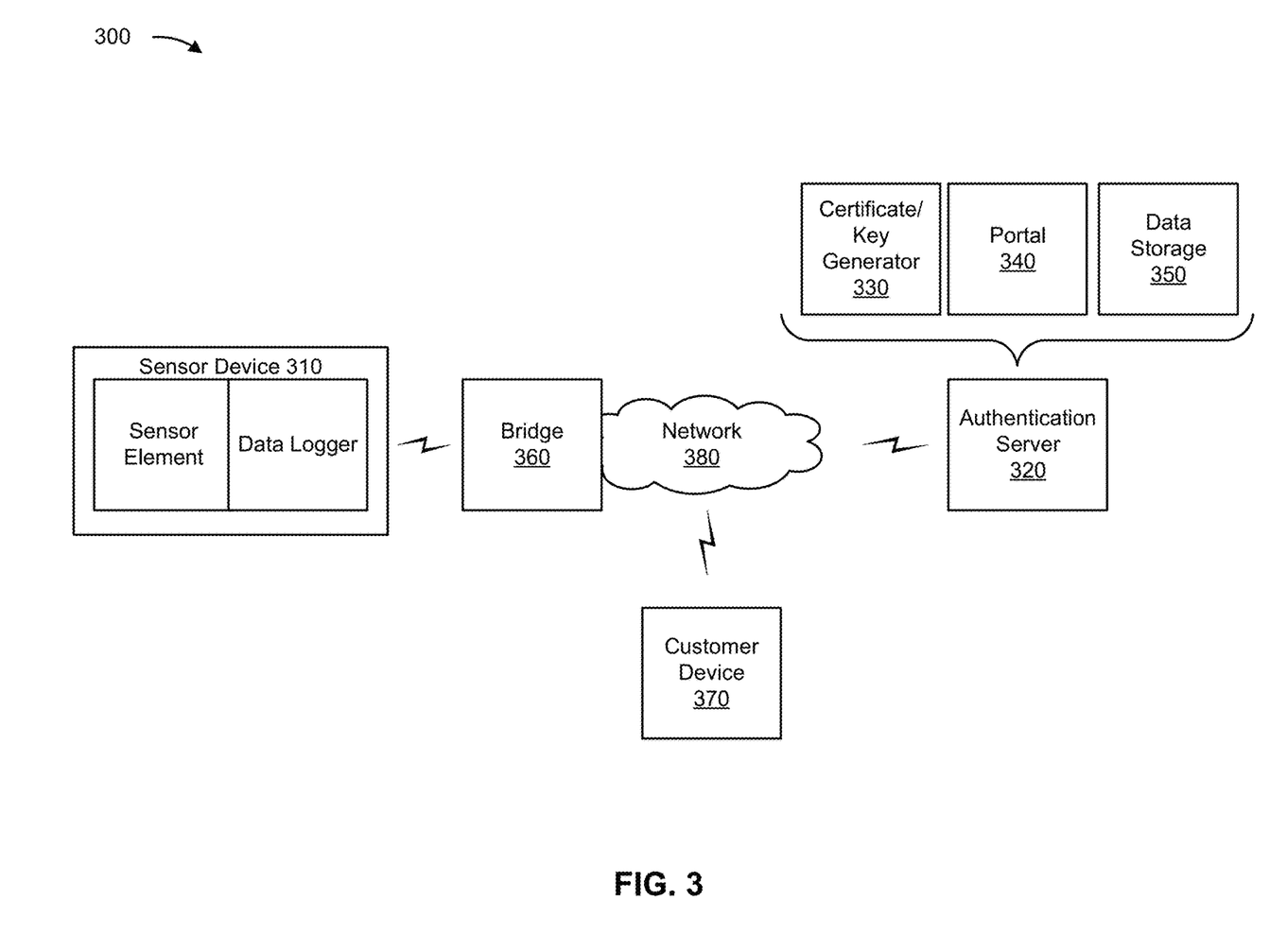
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a sensor device 310, an authentication server 320, a bridge 360, a customer device 370, and a network 380. Devices of environment 300 may interconnect via wired connections, wireless connections, or a combination of wired and wireless connections.

The sensor device 310 includes a sensor element, such as a temperature sensor, a pressure sensor, a humidity sensor, and/or another environment sensor. The sensor element provides measurements and other data to the data logger of the sensor device 310 (e.g., using a bus or another wired connection). The data logger stores the measurements from the sensor element and communicates (e.g., wirelessly or on a wired connection) with the authentication server 320. In some implementations, the data logger also receives commands from the authentication server 320, such as commands to begin recording measurements, commands to stop recording measurements, and/or commands to provide measurements to the authentication server 320.

The authentication server 320 includes one or more devices capable of receiving, storing, and/or routing information from the sensor device 310, as described elsewhere herein. The authentication server 320 may include a communication device and/or a computing device configured to communicate with the sensor device 310, the bridge 360, and/or the customer device 370. In some implementations, the customer device 370 and the authentication server 320 may use TLS and/or another encryption protocol to securely communicate (e.g., via a portal 340, described below). For example, the authentication server 320 may include a server, such as an application server, a client server, a web server, a database server, a host server, a proxy server, a virtual server (e.g., executing on computing hardware), or a server in a cloud computing system. In some implementations, the authentication server 320 may forward information to computing hardware used in a cloud computing environment.

As further shown in FIG. 3, the authentication server 320 may implement a certificate (and/or key) generator 330. Accordingly, the certificate generator 330 may generate a device certificate, as described herein, for the data logger to verify information transmitted to the authentication server 320. Additionally, in some implementations, the certificate generator 330 may generate an owner certificate, as described herein, for the customer device 370 to verify commands for the data logger transmitted to the authentication server 320. Additionally, the authentication server 320 may implement the portal 340. Accordingly, the customer device 370 may interact with the authentication server 320 using the portal (e.g., to receive information, such as authenticated measurements from the data logger, and/or to provide commands for the data logger). In some implementations, the authentication server 320 may further include a data storage 350 to cache information from the data logger (e.g., before transmitting the information to the customer device 370). Alternatively, the authentication server 320 may store information from the data logger until the customer device 370 requests that the authentication server 320 delete the information.

The bridge 360 includes one or more devices capable of receiving, storing, and/or routing information from the sensor device 310, as described elsewhere herein. The authentication server 320 may include a communication device and/or a computing device configured to communicate with the sensor device 310 and the authentication server 320. For example, the bridge 360 may include a router, a base station, and/or another type of device with a transceiver configured to communicate wireless with the sensor device 310 (e.g., using Wi-Fi, Bluetooth®, and/or another similar protocol). In some implementations, the bridge 360 may intermediate between the authentication server 320 and the sensor device 310. For example, the bridge 360 and the authentication server 320 may use TLS and/or another encryption protocol to securely communicate.

The customer device 370 includes one or more devices capable of receiving information from and/or transmitting information to the authentication server 320, as described elsewhere herein. The customer device 370 a wireless communication device, a user device (e.g., a mobile phone, a user equipment, a laptop computer, a tablet computer, a desktop computer), or a similar type of device.

The network 380 includes one or more wired and/or wireless networks. For example, the network 380 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 380 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
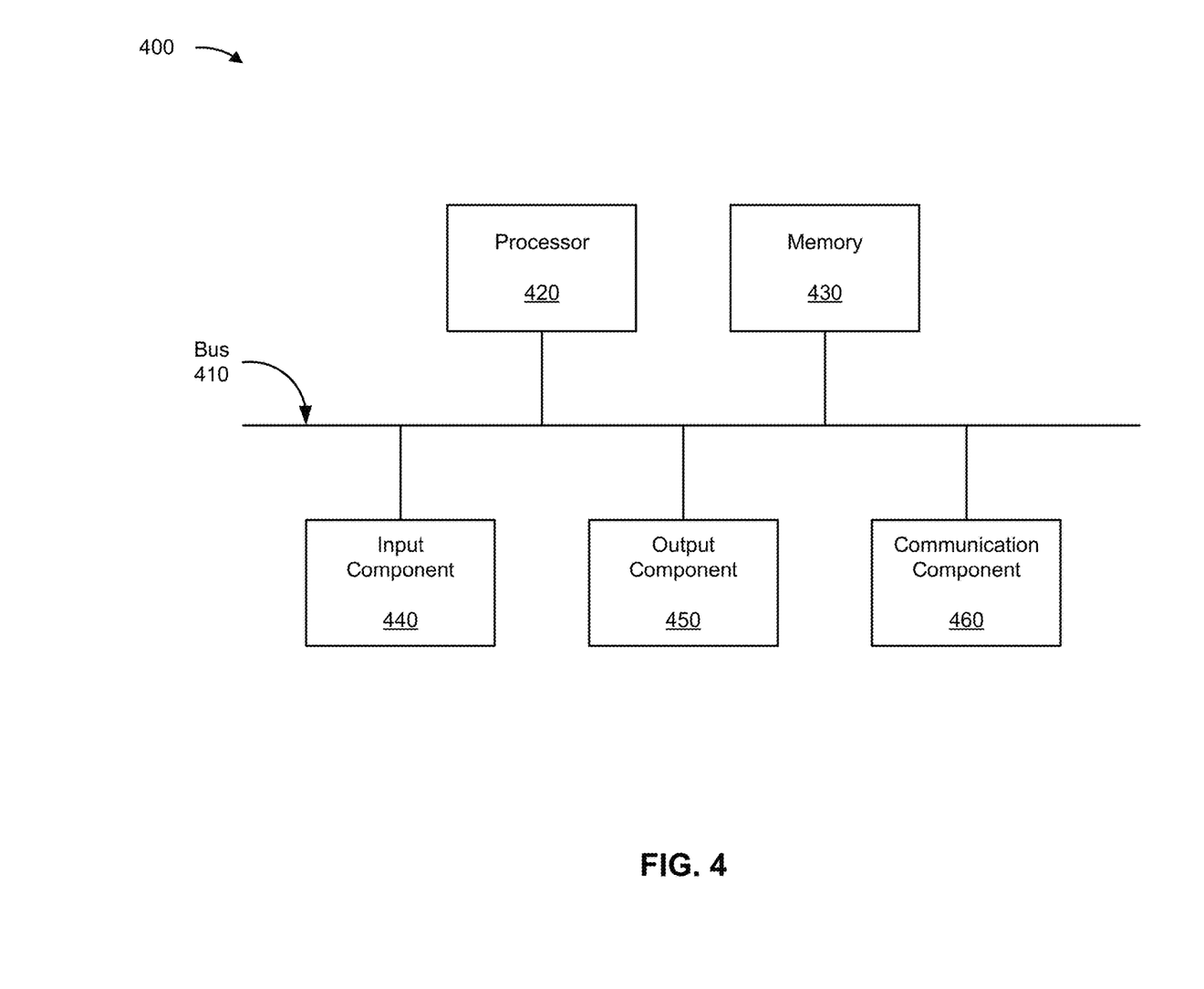
FIG. 4 is a diagram of example components of one or more devices of FIG. 3.

FIG. 4 is a diagram of example components of a device 400, which may correspond to a data logger, a bridge, a customer device, and/or an authentication server. In some implementations, a data logger, a bridge, a customer device, and/or an authentication server include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
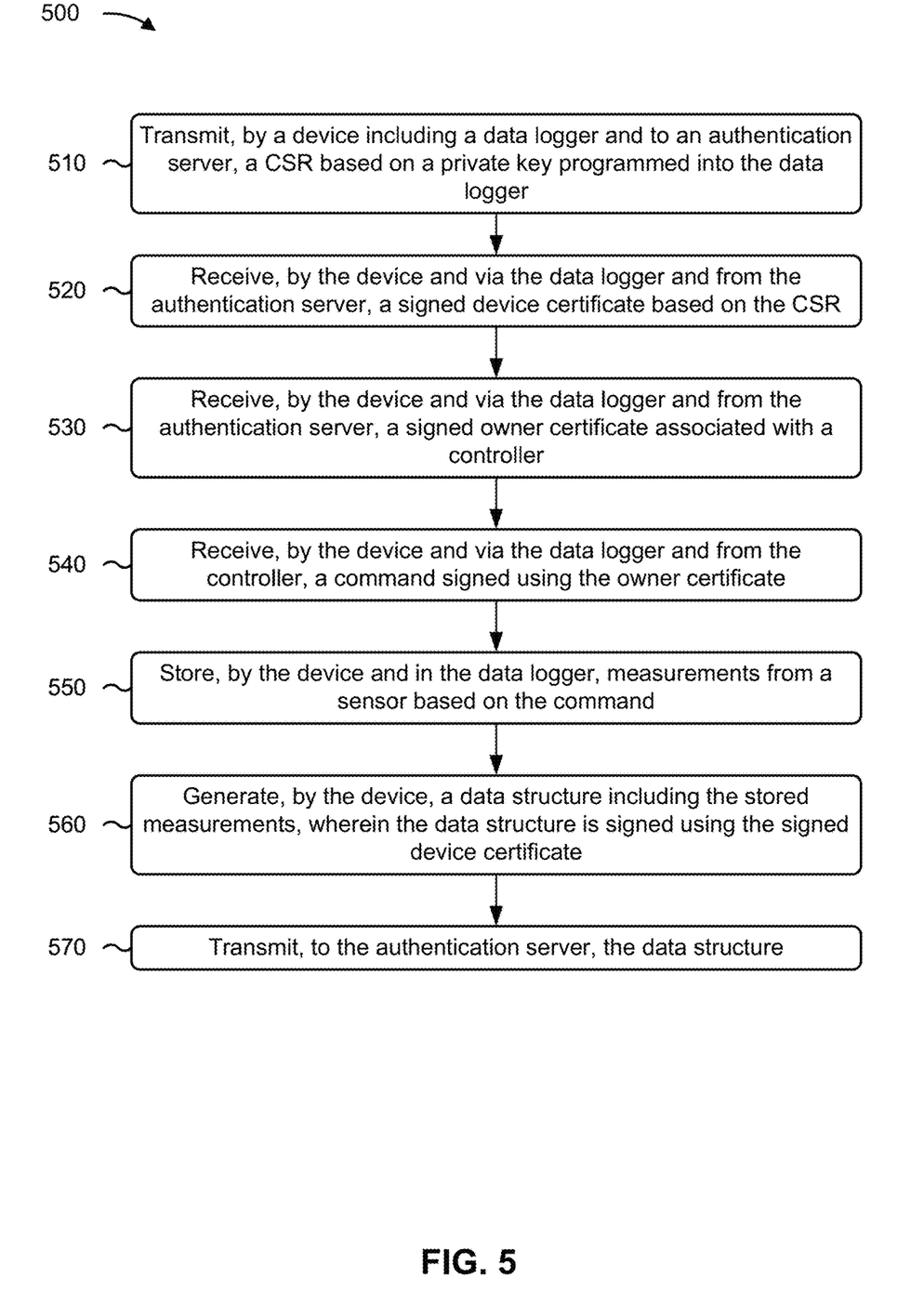
FIG. 5 is a flowchart of an example processes relating to authenticating sensor data.

FIG. 5 is a flowchart of an example process 500 associated with authenticating sensor data. In some implementations, one or more process blocks of FIG. 5 may be performed by a device (e.g., sensor device 310). In some implementations, one or more process blocks of FIG. 5 may be performed by another device or a group of devices separate from or including the device, such as an authentication server (e.g., authentication server 320), a bridge (e.g., bridge 360), and/or a customer device (e.g., customer device 370). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include transmitting, to an authentication server, a CSR based on a private key stored on a data logger that is integrated with a sensor within the device (block 510). For example, the sensor device may transmit, to an authentication server, a CSR based on a private key stored on the data logger, as described herein.

As further shown in FIG. 5, process 500 may include receiving, via the data logger and from the authentication server, a signed device certificate based on the CSR (block 520). For example, the sensor device may receive, via the data logger and from the authentication server, a signed device certificate based on the CSR, as described herein. In some implementations, process 500 further includes verifying the signed device certificate using the private key. The signed device certificate may be received via a bridge.

As further shown in FIG. 5, process 500 may include receiving, via the data logger and from the authentication server, a signed owner certificate associated with a controller (block 530). For example, the sensor device may receive, via the data logger and from the authentication server, a signed owner certificate associated with a controller, as described herein.

As further shown in FIG. 5, process 500 may include receiving, via the data logger and from the controller, a command signed using the owner certificate (block 540). For example, the sensor device may receive, via the data logger and from the controller, a command signed using the owner certificate, as described herein. In some implementations, process 500 further includes verifying the command using the signed owner certificate. The command may be received via a bridge.

As further shown in FIG. 5, process 500 may include storing, in the data logger, measurements from the sensor based on the command (block 550). For example, the sensor device may store, in the data logger, measurements from the sensor based on the command, as described herein.

As further shown in FIG. 5, process 500 may include generating a data structure including the stored measurements, where the data structure is signed using the signed device certificate (block 560). For example, the sensor device may generate a data structure, including the stored measurements, that is signed using the signed device certificate, as described herein. In some implementations, the data structure is unencrypted.

As further shown in FIG. 5, process 500 may include transmitting, to the authentication server, the data structure (block 570). For example, the sensor device may transmit, to the authentication server, the data structure, as described herein. The data structure may be transmitted to the authentication server via a bridge.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, or the like) on which machine-readable instructions (e.g., code in the form of, for example, software and/or firmware) can be stored. The instructions may be stored for any suitable duration of time, such as permanently, for an extended period of time (e.g., while a program associated with the instructions is executing), or for a short period of time (e.g., while the instructions are cached, during a buffering process, or the like). Further, as used herein, each of the terms "tangible machine-readable medium," "non-transitory machine-readable medium" and "machine-readable storage device" is expressly defined to exclude propagating signals. That is, as used in any claim herein, a "tangible machine-readable medium," a "non-transitory machine-readable medium," and a "machine-readable storage device," or the like, should not be interpreted as being implemented as a propagating signal.

As used herein, satisfying a threshold may, depending on the context, refer to a value being greater than the threshold, greater than or equal to the threshold, less than the threshold, less than or equal to the threshold, equal to the threshold, not equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method for authenticating measurements, comprising:
    storing a secure boot key in a read-only portion of a memory of a data logger included in a device;
    booting a secure operating system using the secure boot key;
    generating, by the secure operating system, a private key;
    transmitting, by the device including the data logger and to an authentication server, a certificate signing request (CSR) based on the private key generated by the secure operating system,
        wherein the data logger is integrated with a sensor within the device;
    receiving, by the device and via the data logger and from the authentication server, a signed device certificate based on the CSR;
    receiving, by the device and via the data logger and from the authentication server, a signed owner certificate associated with a controller;
    receiving, by the device and via the data logger and from the controller, a command signed using the owner certificate;
    storing, by the device and in the data logger, measurements from the sensor based on the command;
    generating, by the device, a data structure including the stored measurements, wherein the data structure is signed using the signed device certificate; and transmitting, to the authentication server, the data structure.

2. The method of claim 1, wherein the data structure is unencrypted.

3. The method of claim 1, further comprising:
verifying the command using the signed owner certificate.

4. The method of claim 1, further comprising:
verifying the signed device certificate using the private key.

5. The method of claim 1, wherein receiving the signed device certificate comprises:
receiving the signed device certificate via a bridge.

6. The method of claim 1, wherein receiving the command comprises:
receiving the command via a bridge.

7. The method of claim 1, wherein transmitting the data structure comprises:
transmitting the data structure to the authentication server via a bridge.

8. A sensor device, comprising:
one or more memories; and
one or more processors, communicatively coupled to the one or more memories, configured to:
booting a secure operating system using a secure boot key stored in a read-only portion of a memory of a data logger;
generating, by the secure operating system, a private key;
transmit, by the sensor device and to an authentication server, a certificate signing request (CSR) based on the private key generated by the secure operating system,
wherein the data logger is integrated with a sensor within the sensor device;
receive, by the sensor device and via the data logger and from the authentication server, a signed device certificate based on the CSR;
receive, by the sensor device and via the data logger and from the authentication server, a signed owner certificate associated with a controller;
store, by the sensor device and in the data logger, measurements from the sensor;
receive, by the sensor device and via the data logger and from the controller, a command signed using the owner certificate;
generate, by the sensor device and based on the command, a data structure including the stored measurements and signed using the device certificate; and
transmit, to the authentication server, the data structure.

9. The sensor device of claim 8, wherein the data structure is unencrypted.

10. The sensor device of claim 8, wherein the one or more processors are further configured to:
verify the command using the signed owner certificate.

11. The sensor device of claim 8, wherein the one or more processors are further configured to:
verify the signed device certificate using the private key.

12. The sensor device of claim 8, wherein, to receive the signed device certificate, the one or more processors are configured to:
receive the signed device certificate via a bridge.

13. The sensor device of claim 8, wherein, to receive the command, the one or more processors are configured to:
receive the command via a bridge.

14. The sensor device of claim 8, wherein, to transmit the data structure, the one or more processors are configured to:
transmit the data structure to the authentication server via a bridge.

15. A tangible machine-readable medium storing a set of instructions, the set of instructions comprising:
one or more instructions that, when executed by one or more processors of a device, cause the device to:
booting a secure operating system using a secure boot key stored in a read-only portion of a memory of a data logger included in the device;
generating, by the secure operating system, a private key;
transmit, by the device and to an authentication server, a certificate signing request (CSR) based on the private key generated by the secure operating system,
wherein the device includes the data logger integrated with a sensor within the device;
receive, at the device and via the data logger and from the authentication server, a signed device certificate based on the CSR;
receive, by the device and via the data logger and from the authentication server, a signed owner certificate associated with a controller;
store, by the device and in the data logger, measurements from the sensor;
receive, by the device and via the data logger and from the controller, a command signed using the owner certificate;
generate, by the device and based on the command, a data structure including the stored measurements and signed using the device certificate; and
transmit, to the authentication server, the data structure.

16. The tangible machine-readable medium of claim 15, wherein the data structure is unencrypted.

17. The tangible machine-readable medium of claim 15, wherein the one or more instructions, when executed by the one or more processors, further cause the device to:
verify the command using the signed owner certificate.

18. The tangible machine-readable medium of claim 15, wherein the one or more instructions, when executed by the one or more processors, further cause the device to:
verify the signed device certificate using the private key.

19. The tangible machine-readable medium of claim 15, wherein the one or more instructions, that cause the device to receive the signed device certificate, cause the device to:
receive the signed device certificate via a bridge.

20. The tangible machine-readable medium of claim 15, wherein the one or more instructions, that cause the device to receive the command, cause the device to:
receive the command via a bridge.

* * * * *